United States Patent

Dauvergne

[11] Patent Number: 6,066,040
[45] Date of Patent: May 23, 2000

[54] PASSENGER COMPARTMENT AIR CONDITIONING APPARATUS, IN PARTICULAR FOR MOTOR VEHICLES

[75] Inventor: Jean Dauvergne, Gondecourt, France

[73] Assignee: Plastic Omnium Auto Interierur, Catteret Lyon, France

[21] Appl. No.: 09/091,687

[22] PCT Filed: Dec. 5, 1996

[86] PCT No.: PCT/FR96/01947

§ 371 Date: Jul. 21, 1998

§ 102(e) Date: Jul. 21, 1998

[87] PCT Pub. No.: WO97/22490

PCT Pub. Date: Jun. 26, 1997

[30] Foreign Application Priority Data

Dec. 19, 1995 [FR] France ................... 95 155592

[51] Int. Cl.⁷ .................................................. B60H 1/34
[52] U.S. Cl. .......................................... 454/152; 454/155
[58] Field of Search .................... 454/155, 152, 454/69

[56] References Cited

U.S. PATENT DOCUMENTS

| 2,237,452 | 4/1941 | Samuels | 454/155 |
| 2,894,444 | 7/1959 | Boylan et al. | 454/155 |
| 3,200,732 | 8/1965 | Chantiles et al. | 454/155 |
| 3,861,281 | 1/1975 | Godwin | 454/155 |

FOREIGN PATENT DOCUMENTS 361166718  1/1986  Japan ..................... 454/69

*Primary Examiner*—Henry Bennett
*Assistant Examiner*—Derek S. Boles
*Attorney, Agent, or Firm*—Harrison & Egbert

[57] ABSTRACT

An air conditioning for a passenger compartment of a vehicle having at least one air flow conduit and a diffuser communicating with the conduit. The conduit is in non-colinear relation with the diffuser. The diffuser is capable of channelling air toward the passenger compartment. The conduit is formed of a material capable of deformable contact with the diffuser. The diffuser has an element for transversely closing off the conduit. The contours of the diffuser mate with the walls of the conduit by deforming the contours to ensure a tightness of the closure.

10 Claims, 1 Drawing Sheet

PASSENGER COMPARTMENT AIR CONDITIONING APPARATUS, IN PARTICULAR FOR MOTOR VEHICLES

TECHNICAL FIELD

The present invention relates to an air conditioning installation for a passenger compartment, in particular that of a motor vehicle.

Although more especially intended for such applications, the invention can also be used in all sectors of industrial activity in which there is occcasion to guide the circulation of a fluid.

BACKGROUND ART

At the present time, in the field of motor vehicles, for example, numerous devices are known that enable the air from a flow generator to be directed towards the interior passenger compartment of the vehicle. These are generally constituted by a network, or system, of conduits, concealed beneath the dashboard, ending in a diffuser emerging through the latter.

In order to ensure optimum ventilation of the passenger compartment, the said diffusers are, most often, four in number; two in the centre, responsible for projecting a jet of air towards the back seat passengers between the front seats, and two others, located laterally, each sending a jet in the direction of the front seat passengers and, incidentally, in the direction of the side windows so as to contribute to their defrosting and/or demisting.

In known devices, the conduits have a tubular structure. As to the diffuser, this is fitted into the end of one of the conduits through a housing provided under the dashboard. For this purpose, a groove is provided on the inner walls of the said tubular conduit so as to cc-operate with the said diffuser.

However, the tightness of such systems is not satisfactory. The fit of the diffuser in the groove, in fact, is generally not accurate enough, which results in pressure losses making it necessary to over-dimension the flow generator.

It should also be noted that this poor fit can give rise to noise, particularly through the effect of vibrations.

In addition, presently known installations necessitate the implementation of numerous additional parts in order to support both the conduits and the diffuser. They are thus costly and take a long time to fit.

The object of the present invention is to provide an air conditioning installation that overcomes the aforementioned drawbacks and permits enhanced tightness of fluid circulation.

Another object of the present invention is to provide an air conditioning installation that is simpler to manufacture.

A further object of the present invention is to provide an air conditioning installation for a passenger compartment that contributes to reducing the noise level in the said passenger compartment.

Another object of the invention is to provide an air conditioning installation which, if applied to the field of motor vehicles, contributes to simplifying dashboard manufacturing processes.

Further objects and advantages of the present invention will emerge in the course of the following description, which is provided merely by way of illustration and is not intended to limit same.

SUMMARY OF THE INVENTION

The present invention relates to an air conditioning installation for a passenger compartment, in particular that of a motor vehicle, including at least one air flow conduit and a diffuser, communicating with the said conduit, non co-linear in relation to the latter, capable of channelling the air towards the passenger compartment, characterised by the fact that:

the diffuser has means for transversely closing off the said conduit;

the conduit is constituted by a material capable of being deformed in contact with the said diffuser so as to ensure the tightness of the closure.

BRIEF DESCRIPTION OF THE DRAWINGS

The present invention will be more readily understood from a study of the following description, accompanied by the annexed drawings, which form an integral part thereof.

DETAILED DESCRIPTION OF THE INVENTION

The present invention relates to an air conditioning installation for a passenger compartment, in particular that of a motor vehicle.

Although more especially intended for such applications, the invention can also be used in all sectors of industrial activity in which there is occasion to guide the circulation of a fluid.

Air conditioning is to be taken, generally speaking, as referring to the ventilation, heating and/or air conditioning of the passenger compartment or the like.

Figure 1:
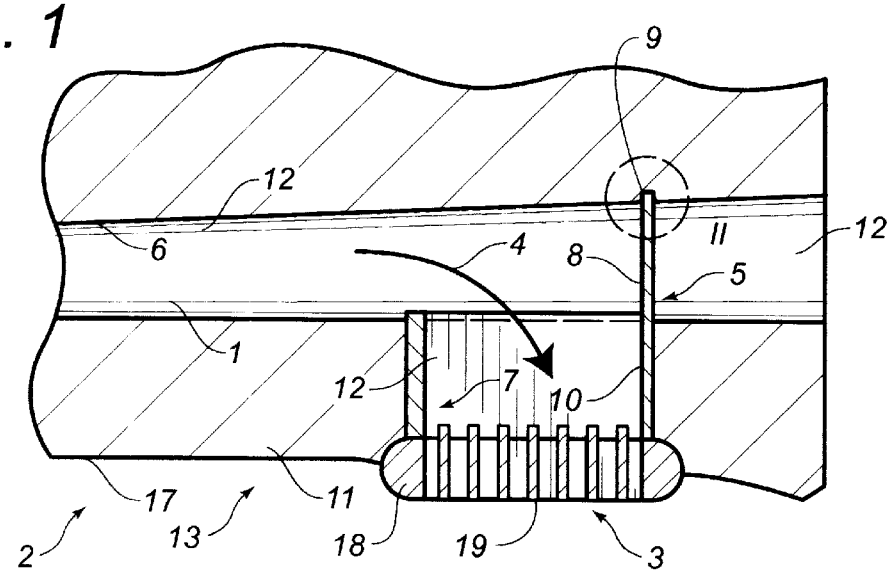
FIG. 1 illustrates, in a cross-section effected in a horizontal plane, an example of an air conditioning installation according to the invention.

Referring to FIG. 1, it will be noted that the air conditioning installation for passenger compartments, according to the invention, includes at least one air flow conduit 1. The latter is located, for example, behind the surface 2, of the wall of the passenger compartment. In the case of application to the field of motor vehicles, conduit 1 is thus located, in particular, beneath the outer surface of the dashboard of the said vehicle.

The air conditioning installation according to the invention also includes a diffuser, 3, communicating with the said conduit 1 and non-co-linear in relation to the latter.

Conduit 1 and diffuser 3 thus enable the air to be channelled, for example, in the direction of arrow 4, in particular from a flow generator towards the interior of the passenger compartment.

According to the invention, diffuser 3 has means 5 for transversely closing off conduit 1. In addition, conduit 1 is constituted by a material capable of being deformed in contact with the said diffuser 3 so as to ensure the tightness of the closure.

Figure 2:
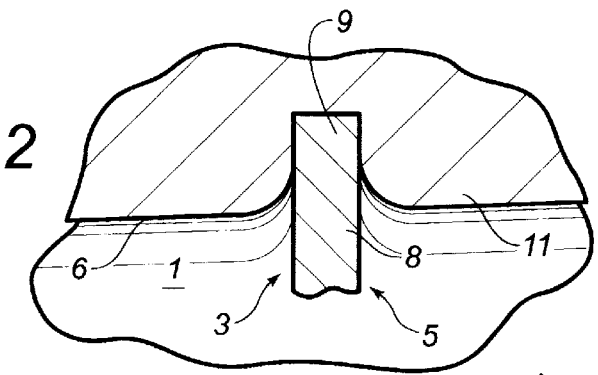
FIG. 2 shows in detail the region marked II in FIG. 1.

As shown in detail in FIG. 2, diffuser 3 thus co-operates with conduit 1 by penetrating the material of its inner wall 6 and ensures, in this way, the reliability of the seal between these two parts. Indeed, conduit 1 being deformed directly by diffuser 3, there is no residual play liable to allow through the flow of air, even partially.

The diffuser 3 is mounted, for example, by forcible penetration of conduit 1, in particular by exceeding the elastic limits of its constituent material.

Referring, once again, to FIG. 1, it will be noted that, according to a particular form of embodiment, diffuser 3 is constituted, for example, by a sleeve 7. As for closing means 5, these are constituted, in particular, by a prolongation 8 of the sleeve 7, the contours 9 of which mate with the walls 6 of conduit 1 by deforming them.

The conduit 1 is, for example, circular in cross-section, while the sleeve 7 is orientated, in particular, substantially perpendicularly in relation to the conduit 1 and includes a skirt 10, for example substantially rectangular in cross-section.

According to this exemplary form of embodiment, prolongation 8 is then substantially planar. It can also, as applicable, be slightly dished and/or bent so as to facilitate deviation of the air flow in the direction of arrow 4.

This being said, according to the example illustrated, the air conditioning installation according to the invention includes at least one support 11 in which are provided recesses 12, capable of constituting, in particular, the conduit 1 and/or a housing for the said diffuser 3.

The conduit 1 thus has the advantage of performing two functions simultaneously, namely taking part in the guiding of the air flow and supporting the diffuser 3. The same applies to the latter, with makes it possible at the same time to block the conduit 1 and to contribute also to guiding the flow. This implementation thus contributes to facilitating the manufacture of the installation according to the invention.

In this connection, conduit 1 is, for example, conical. This makes it possible to simplify its formation when it is constituted by a recess 12 in support 11. In this case, in fact, the said support 11 is obtained, for example, by moulding the said housings 12, in particular, using pins retractable from the mould provided for this purpose. The conical shape of conduit 1 thus promotes stripping from the mould.

Figure 3:
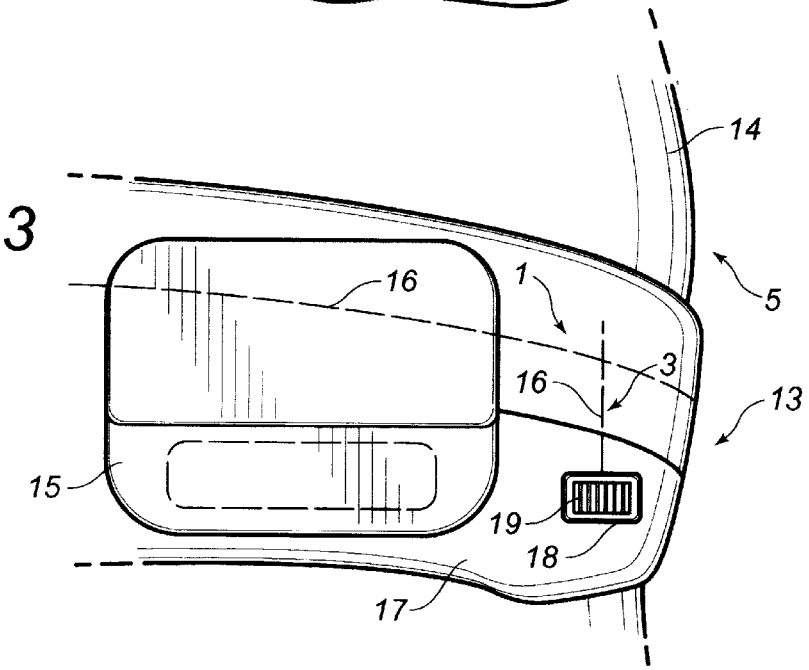
FIG. 3 illustrates an example of an environment of an air conditioning installation according to the invention.

Referring now to FIG. 3, we can see the front portion, on the passenger's side, of a vehicle passenger compartment. The figure thus diagrammatically represents a dashboard 13, which is surmounted by a windscreen 14.

As mentioned earlier, the air conditioning installation according to the invention can be used, in particular, in such a passenger compartment, for example in the area of the dashboard 13, the locations of conduits 1 and diffusers 3 being schematically represented by dotted lines 16. The diffuser 3 emerges at surface 17 of the said dashboard 13.

Furthermore, the latter has, in addition, in a known manner, in particular, a device 15 for an airbag.

According to this application example of the invention, it will be noted, as shown in FIG. 1, that conduit 1 is produced in the dashboard 13, for example constituted by support 11 provided in a solid material, in particular alveolate.

This is to be taken as meaning that the dashboard 13 is formed of a block of material in which are provided locations such as recesses 12 so as to constitute, as mentioned earlier, conduit 1 and/or a housing for diffuser 3.

Such dashboards occupy the previously defined cavity between the front body panel and the dashboards, in the form of shells, to be found in known vehicles.

Such a mode of implementation thus contributes to simplifying dashboard manufacturing processes.

A further advantage of the invention is that the diffuser 3 then proves to be general-purpose and can be used on dashboard 13 both on the passenger's side and on the driver's side.

According to one particular form of embodiment of the invention, diffuser 3 includes a collar 18 capable of co-operating with surface 17 of dashboard 13.

The collar 18 has, for example, a ventilation grille 19, capable of permitting orientation of the jet of air entering the passenger compartment to be adjusted.

Conduit 1 is made, for example, of foam and/or an expanded polymer material, for example one that is flexible on the surface. This could be, in particular, expanded polypropylene and/or polystyrene.

Furthermore, diffuser 3 is made, in particular, of a moulded plastic material, rigid, for example.

It should also be noted that the present invention can also be applied to dashboards made of flexible, rigid or semi-rigid foam of the polyurethane type.

It goes without saying that other implementations of the present invention, within the grasp of a man of the art, could also have been contemplated without, thereby, departing from the scope of the present application.

What is claimed is:

1. An air conditioning installation for a passenger compartment of a motor vehicle comprising:

at least one air flow conduit; and a diffuser communicating with said conduit, said diffuser being in non-colinear relationship with said conduit, said diffuser adapted to channel air toward the passenger compartment, said conduit being formed of a material which is deformable when in contact with said diffuser, said diffuser having means for transversely closing off said conduit, said means being a prolongation of said diffuser, said prolongation having contours which mate with a wall of said conduit by deforming said material of said conduit, said diffuser comprising a sleeve.

2. The installation of claim 1, said conduit having a circular cross-section, said sleeve being oriented substantially perpendicularly to said conduit, said sleeve comprising a skirt of rectangular cross-section, said prolongation being substantially planar.

3. The installation of claim 1, said conduit being of a conical configuration.

4. The installation of claim 1, further comprising:

a dashboard having a support of solid material, said conduit being formed in said dashboard.

5. The installation of claim 4, said diffuser comprising a collar cooperative with a surface of said dashboard.

6. The installation of claim 5, said collar having a ventilation grille formed thereon.

7. The installation of claim 1, said conduit being formed of a foam material.

8. The installation of claim 1, said conduit being formed of an expanded polymer material.

9. The installation of claim 1, said expanded polymer material selected from the group consisting of polypropylene and polystyrene.

10. The installation of claim 1, said diffuser being formed of a molded polymeric material.

* * * * *